in

US008838674B2

(12) United States Patent
D'Amora et al.

(10) Patent No.: US 8,838,674 B2
(45) Date of Patent: Sep. 16, 2014

(54) PLUG-IN ACCELERATOR

(75) Inventors: Bruce D. D'Amora, New Milford, CT (US); James R. Moulic, Poughkeepsie, NY (US); Ashwini K. Nanda, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 1671 days.

(21) Appl. No.: 11/553,000

(22) Filed: Oct. 26, 2006

(65) Prior Publication Data
US 2008/0104223 A1 May 1, 2008

(51) Int. Cl.
*G06F 15/16* (2006.01)
*H04L 29/08* (2006.01)
*G06F 9/50* (2006.01)

(52) U.S. Cl.
CPC .............. *H04L 67/34* (2013.01); *G06F 9/5044* (2013.01); *H04L 67/10* (2013.01)
USPC ........................................................ 709/203

(58) Field of Classification Search
USPC ................... 709/201, 203, 223, 227
See application file for complete search history.

(56) References Cited

U.S. PATENT DOCUMENTS

| | | | | |
|---|---|---|---|---|
| 5,423,042 A * | 6/1995 | Jalili et al. | ..................... | 719/328 |
| 5,961,586 A * | 10/1999 | Pedersen | ....................... | 709/201 |
| 6,446,070 B1 * | 9/2002 | Arnold et al. | .................... | 707/10 |
| 6,658,452 B1 * | 12/2003 | Becker et al. | ................. | 709/201 |
| 6,871,345 B1 | 3/2005 | Crow et al. | | |
| 6,954,777 B1 * | 10/2005 | Fields et al. | .................. | 709/203 |
| 2003/0084091 A1 * | 5/2003 | Agarwalla et al. | ............ | 709/203 |
| 2004/0221005 A1 * | 11/2004 | Albaugh et al. | .............. | 709/203 |
| 2006/0195547 A1 | 8/2006 | Sundarrajan et al. | | |

OTHER PUBLICATIONS

Netshell ("Waves Netshell User's Guide", Mar. 14, 2006, http://web.archive.org/web/*/http://www.waves.com/downloads/pdf/Netshell%20V5.2.pdf, pp. 1-19).*
Netshell ("Waves Netshell Users Guide", Mar. 14, 2006, http://web.archive.org/web/*/http://www.waves.com/downloads/pdf/Netshell%20V5.2.pdf, pp. 1-19).*

* cited by examiner

*Primary Examiner* — Larry Donaghue
*Assistant Examiner* — Marshall Mcleod
(74) *Attorney, Agent, or Firm* — Michael LeStrange; Roberts Mlotkowski Safran & Cole, P.C.

(57) ABSTRACT

A system and method for accelerating the execution of applications in computing environments. The method includes receiving a request for execution of a plug-in of a computing application and analyzing a network for accelerators for executing the plug-in. The method further includes identifying a designated accelerator residing on a device that is remote from the application and executing the plug-in with the designated accelerator.

22 Claims, 4 Drawing Sheets

PLUG-IN ACCELERATOR

FIELD OF THE INVENTION

The present invention generally relates to hybrid computing environments, and more specifically relates to a system and method for accelerating the execution of applications in a computing environment by distributing, managing, balancing, and executing application plug-ins.

BACKGROUND OF THE INVENTION

Heterogeneous compute systems are commonly used to support many business and/or engineering application solutions. Typically, a business will utilize a set of applications executing on a variety of client workstations and servers to provide an entire business solution. A problem arises when the compute power requirements of an application (e.g., software program) exceed the compute power available in the hardware of the client workstation. In such situations, applications run inefficiently (i.e., too slow) or not at all, thereby reducing or eliminating the value provided by the application.

Efforts to overcome the above-noted problems include providing applications that have a client interface (e.g., web browser, etc.) to a server application. In this way, the server manages the data and performs compute intensive tasks. Alternatively, systems may operate on batch scheduled jobs that are submitted from the client workstation to the server and scheduled for processing across a grid or cluster connected network of servers. In both of these cases, the entire application is dispatched (e.g., ported) to the server (or various server nodes), processed, and then returned to the client workstation. Because the entire application is dispatched, the granularity of compute tasks is very coarse and, hence, inefficient.

In some cases, the time involved in dispatching the entire application to a server can render the above-noted solutions unacceptable. For example, dispatching the entire application to a server for processing is simply not feasible for applications that are primarily designed to run on a workstation, driven by an interactive user, and require highly compute intensive tasks (e.g., physically based modeling, image processing, 3D geometric modeling and rendering, etc.). In these cases, instead of sending the entire application to a server, the client workstation may be provided with accelerator hardware of its own (e.g., accelerator boards, graphics adapters, etc.) However, it can be cost prohibitive to equip numerous client workstations with such accelerator hardware. Moreover, software development normally outpaces that of hardware, and new applications that require even more compute power often quickly render expensive accelerator hardware obsolete or an accelerator hardware may not exist in a workstation form factor.

Additionally, some applications reside and execute on a server, but have components that benefit or require acceleration via specialized system accelerators that are not present on the server. In this case, the server faces the same problems described above with respect to client workstations: an application that requires more compute power than is locally available.

Accordingly, there exists a need in the art to overcome the deficiencies and limitations described hereinabove.

SUMMARY OF THE INVENTION

In a first aspect of the invention, a method comprises receiving a request for execution of a plug-in of a computing application and analyzing a network for accelerators for executing the plug-in. The method further comprises identifying a designated accelerator residing on a device that is remote from the application and executing the plug-in with the designated accelerator.

In a second aspect of the invention, there is provided a computer program product comprising a computer readable medium having a computer readable program. The computer readable program, when executed on a computer, causes the computer to receive a request for execution of a plug-in of an application and analyze a network for accelerators for executing the plug-in. The computer readable program further causes the computer to identify a designated accelerator residing on a device that is remote from the application and execute the plug-in with the designated accelerator.

In a third aspect of the invention, there is a networked system comprising a computing application associated with a plug-in. The system includes a first manager arranged to associate the plug-in with at least one accelerator for executing the plug-in. The system additionally includes a second manager arranged to determine a location of the at least one accelerator. The first manager and the second manager are disposed at different locations within a network.

In a fourth aspect of the invention, there is a method comprising sending a request for execution of a plug-in of a computing application, receiving a designation of an accelerator for executing the plug-in, and receiving, over a network, results from execution of the plug-in.

DETAILED DESCRIPTION OF EMBODIMENTS OF THE INVENTION

The invention is directed to a system and method for accelerating the execution of applications in computing environments. Implementations of the invention provide for the distribution, management, and execution of application plug-ins. In this manner, applications may be efficiently utilized on a local workstation, without the time delay associated with dispatching the entire application across a network and without the cost of providing accelerator hardware locally.

Figure 1:
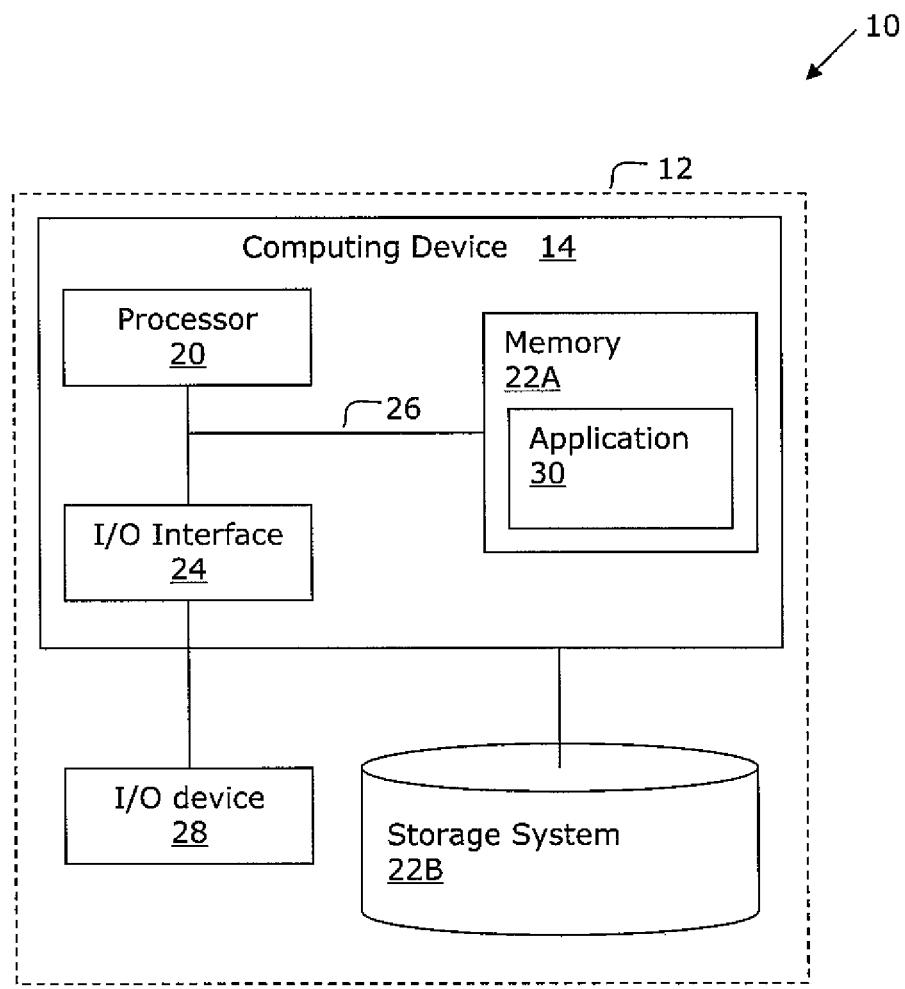
FIG. 1 shows an illustrative environment according to aspects of the invention.

FIG. 1 shows an illustrative environment 10 for managing the processes in accordance with the invention. To this extent, the environment 10 includes a computer infrastructure 12 that can perform the processes described herein. In particular, the computer infrastructure 12 is shown including a computing device 14 that comprises a management system 30, which makes computing device 14 operable to perform the processes described herein. The computing device 14 is shown including a processor 20, a memory 22A, an input/output (I/O) interface 24, and a bus 26. Further, the computing device 14 is shown in communication with an external I/O device/resource 28 and a storage system 22B. As is known in the art, in general, the processor 20 executes computer program code, which is stored in memory 22A and/or storage system 22B. While executing computer program code, the processor 20 can read and/or write data, such as the business or engineering solution 50, to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

In any event, the computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in other embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in one embodiment, the computer infrastructure 12 comprises two or more computing devices (e.g., a server cluster) that communicate over any type of communications link, such as a network, a shared memory, or the like, to perform the process described herein. Further, while performing the process described herein, one or more computing devices in the computer infrastructure 12 can communicate with one or more other computing devices external to computer infrastructure 12 using any type of communications link. In either case, the communications link can comprise any combination of various types of wired and/or wireless links; comprise any combination of one or more types of networks (e.g., the Internet, a wide area network, a local area network, a virtual private network, etc.); and/or utilize any combination of various types of transmission techniques and protocols.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

In another embodiment, the invention provides a business method that performs the process steps of the invention on a subscription, advertising, and/or fee basis. That is, a service provider, such as a Solution Integrator, could offer to provide plug-in management and/or execution to a user. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Figure 2:
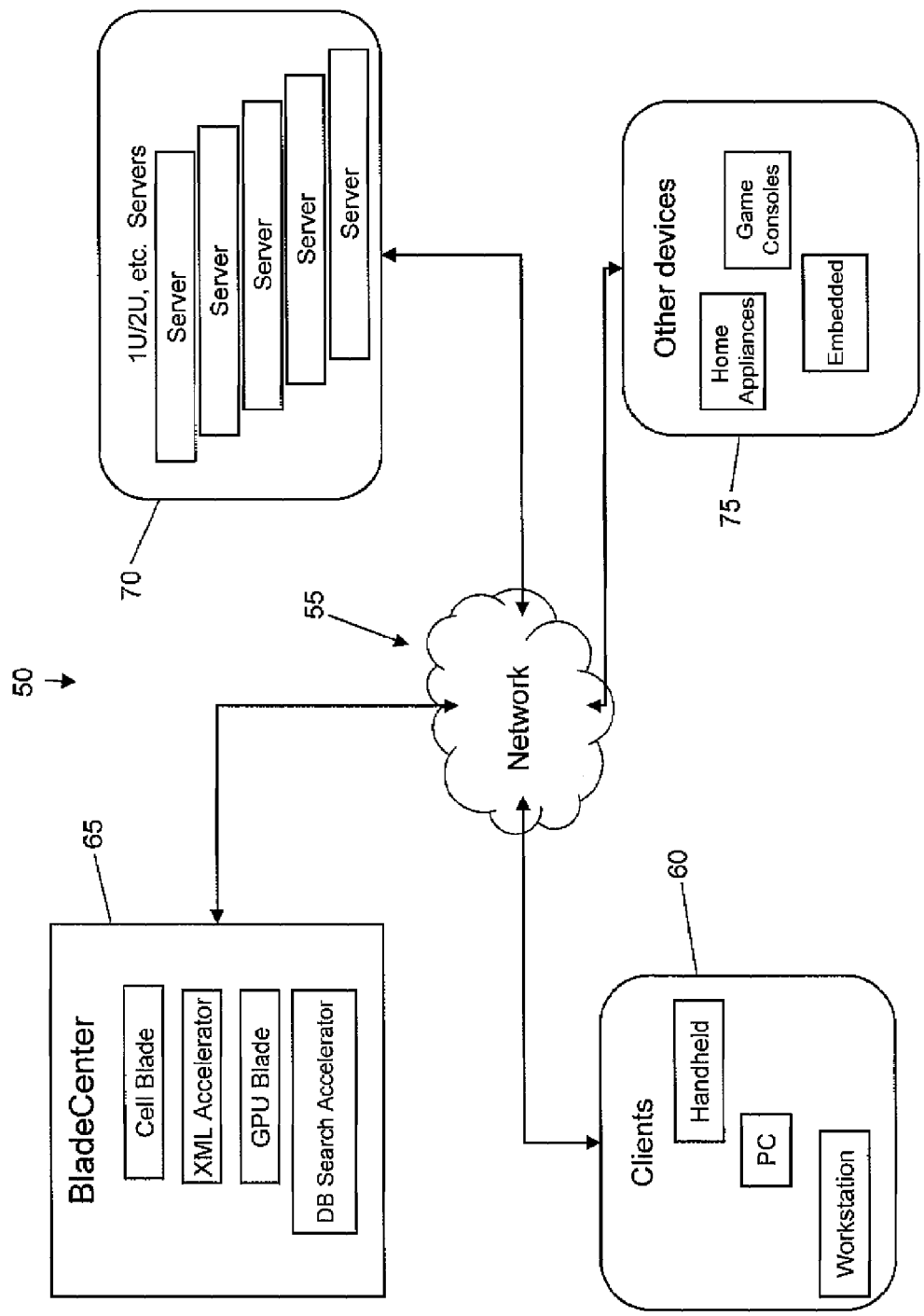
FIG. 2 shows a hybrid computing environment according to aspects of the invention.

FIG. 2 shows a hybrid computing system 50 according to aspects of the invention. The hybrid computing system may comprise any number of any types of components all connected, directly or indirectly, by a network 55. The network 55 may be any type of electronic communication network, such as, for example, the Internet, a wide area network, a local area network, a virtual private network, wireless network, Ethernet, etc.

Components of the system 50 may be composed of any type of resource (e.g., client, server, etc.), any type of hardware platform, and any type of operating system. For example, client computing machines 60 may be connected to the network 55. In embodiments, client computing machines 60 can include, but are not limited to, client workstations, personal computers, telephones, personal digital assistants, etc. It is understood that the system 50 may comprise any suitable number of client computing machines 60 as required by the task to be performed.

Still referring to FIG. 2, system 50 may further comprise a blade type server 65. In embodiments, the blade type server 65 comprises one or more blade servers of any type (e.g., cell blade, graphics processing unit blade, XML accelerator, database search accelerator, etc.), although other combinations of components may be employed. The system 50 may further comprise a rack server 70. In embodiments, the rack server 70 comprises one or more rack servers of any type (e.g., 1U, 2U, etc.), although other combinations of components may be employed. It is understood that the system 50 may comprise any suitable number of servers as required by the intended use of the system 50. The system 50 may further comprise other computing devices 75, such as, for example, game consoles, home appliances, embedded devices, etc.

According to implementations of the invention, the system 50 comprises at least one application (not shown). The application comprises an executable program (e.g., software) that may reside at any component (e.g., workstation, game console, server blade, etc.) of the system 50. For example, the application may comprise a graphics-intensive three dimensional modeling program (e.g., a computational fluid dynamics (CFD) program) that is stored in the memory of a client workstation.

In addition to the application, the system 50 comprises at least one plug-in (not shown). A plug-in is well known in the art as a separately executable program (or component of a program) that interacts with an application, often providing additional functionality that is not available from the application alone. For example, the application may be a web browser, and the plug-in may be a component that provides the web browser with the capability to play video clips across the internet. In conventional systems, the plug-in is stored locally with the application. In the inventive system 50, however, the plug-in may reside anywhere within the system 50, and is not limited to reside on the same component as the application. Moreover, plural plug-ins may be located at various locations within the system 50.

Still further, the system 50 comprises at least one accelerator (not shown). An accelerator is well known in the art as a component that performs a specific function (or functions) faster than they would normally be performed by a central processing unit (CPU). Accelerators are often embodied in hardware, such as, for example, a coprocessor (e.g., floating point unit) or an adapter card (e.g., video card). An accelerator may be designed to execute a specific class of plug-in, and, conversely, plug-ins may be designed to be executed on a particular type of accelerator. In this manner, the accelerator may be used to speed up the execution of a plug-in, which, in turn, is used by the application (thereby increasing the speed and/or functionality of the application). In embodiments of the invention, the accelerator may reside anywhere within the system 50, such as, for example, as a card in a workstation, a chip on a server blade, a stand alone hardware component wired to the network 55, etc. Moreover, multiple accelerators may be disposed at various locations within the system 50.

In embodiments, the system 50 further comprises at least one client plug-in manager (PIM) and at least one server PIM. The client PIM and server PIM cooperate to provide an application with the execution of a plug-in on an appropriate accelerator, regardless of the respective locations of the application, plug-in, and accelerator within the system 50. That is, the application may be located at a first location (e.g., client workstation) in the system 50, the plug-in may be located at a second location (e.g., server blade), and the accelerator may be located at a third location (e.g., a specific IP address). The client PIM and server PIM coordinate to arrange execution of the plug-in on the accelerator, and the results of the execution are returned to the application. By dispatching plug-ins for execution, the system 50 provides an application with increased compute power without the time delay previously associated with dispatching the entire application to a remote location and without the cost of providing accelerator hardware locally.

Figure 3:
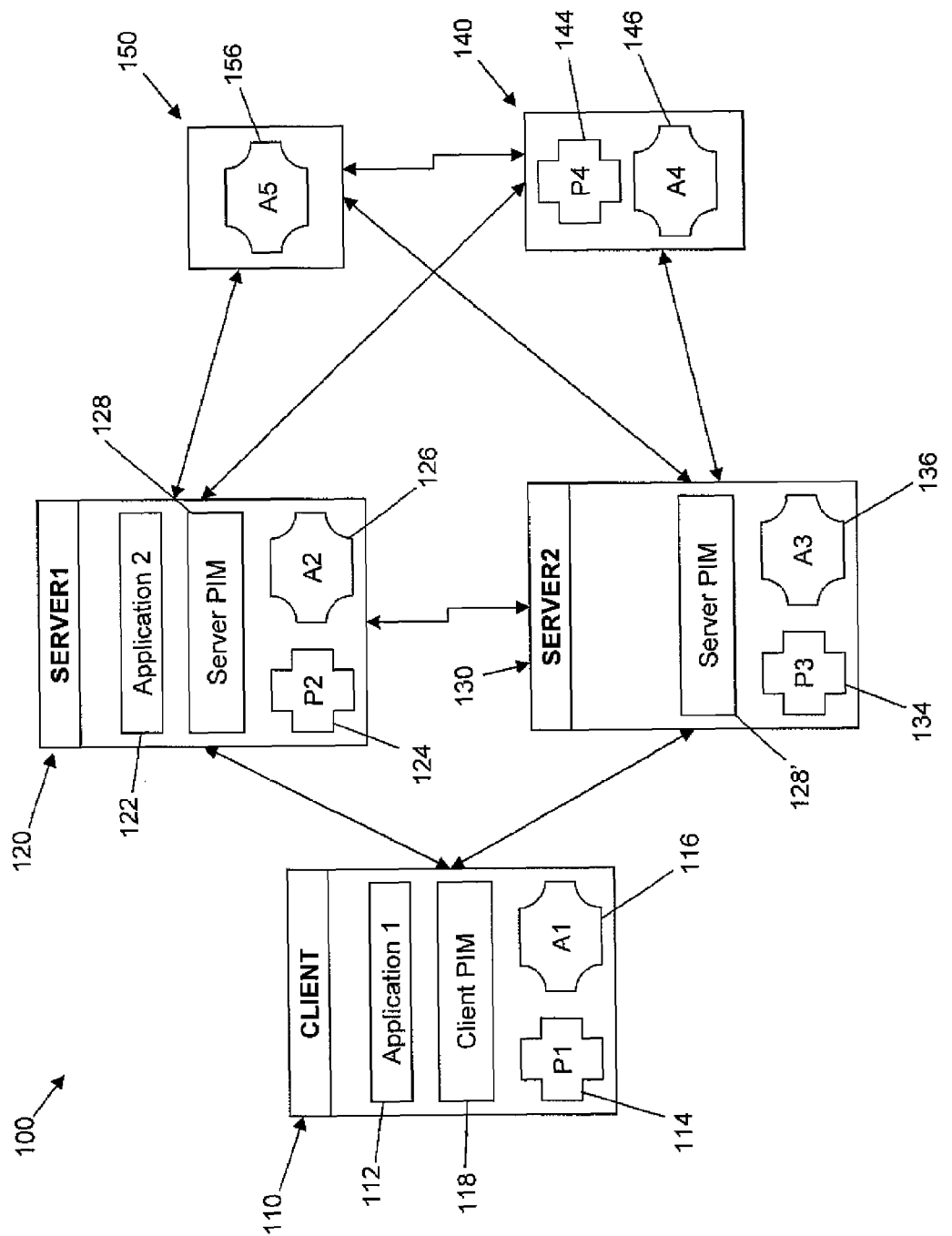
FIG. 3 shows an illustrative system according to aspects of the invention.

FIG. 3 shows a subsystem 100 of previously described system 50, according to aspects of the invention. The arrows in FIG. 3 represent communication between components of the system across the network 55. For ease of explanation, the subsystem is depicted and described with respect to a single client, two servers, and two stand-alone accelerators, although it is understood that any suitable number of any type of component may be employed according to the invention.

In embodiments, subsystem 100 includes a client 110, which, as described above, may comprise any type of computing machine, such as, for example, a client workstation, personal computer, telephone, personal digital assistant, game console, home appliance, embedded device, etc. First application 112, first plug-in 114, and first accelerator 116 reside on the client 110. The first application 112, first plug-in 114, and first accelerator 116 may be of any suitable type, and are not necessarily related to each other (although they may be designed to cooperate with other). A client PIM 118, described in greater detail below, also resides on the client 110.

Subsystem 100 further includes a first server node 120, which may comprise any suitable type of server (blade, rack, stand-alone, etc.). In embodiments, the first server node 120 is remote from the client 110 in terms of network location. Second application 122, second plug-in 124, and second accelerator 126 reside on the first server node 120. The second application 122, second plug-in 124, and second accelerator 126 may be of any suitable type, and are not necessarily related to each other (although they may be designed to cooperate with other). A server PIM 128, described in greater detail below, also resides on the first server 120.

Still referring to FIG. 3, in embodiments, subsystem 100 further includes a second server node 130, which, as described above, may comprise any suitable type of server (blade, rack, stand-alone, etc.). In embodiments, the second server node 130 is remote from the first server node 120 and client 110 in terms of network location. Third plug-in 134 and third accelerator 136 reside on the second server node 130. The third plug-in 124 and third accelerator 126 may be of any suitable type, and are not necessarily related to each other (although they may be designed to cooperate with each other). Another instance of a server PIM (shown as 128') also resides on the second server 130.

In implementations, subsystem 100 comprises a third server node 140, which includes a fourth plug-in 144 and fourth accelerator 146. And the subsystem 100 may further comprise a fourth server node 150, which includes fifth accelerator 156. The third server node 140 and fourth server node 150 may comprise, for example, stand alone accelerators that are connected to the network (e.g., have an IP address). In embodiments, the third server node 140 and fourth server node 150 are remote from each other and remote from the first server node 120, second server node 130, and client 110.

In embodiments, the instances of the client PIM (e.g., 118) comprise a software program (or programs) stored in memory or on storage media of the client 110. The client PIM maintains a record (e.g., register, stored data, etc.) of the location and type of each plug-in (e.g., 114, 124, 134, 144) of the subsystem 100. The client PIM record may also include an association between a respective plug-in and an appropriate accelerator(s) (e.g., 116, 126, 136, 146, 156) for the plug-in. The client PIM record may be generated manually, such as through a system configuration file, as is known in the art. Alternatively, the client PIM record may be automatically generated, such as by querying the network for components at system start-up or at predetermined intervals, as is known in the art. Furthermore, the client PIM is operable to communicate with local applications to receive requests from the applications for the execution of plug-ins. Such communication may be accomplished in any suitable manner.

In embodiments, instances of the server PIM (e.g., 128, 128') comprise a software program (or programs) stored in memory or on storage media of a server (e.g., 120, 130). The server PIM also maintains a record (e.g., register, stored data, ip address, hostname, etc.) that includes the locations of the accelerator(s) (e.g., 116, 126, 136, 146, 156) of the subsystem 100. The server PIM record may be generated manually or automatically, as described above, and may be expressed, for example, as a shared object location or a remote location. Furthermore, instances of the server PIM also contain a module for determining real-time system load (e.g., the capacity at which each component is operating, etc.), as is known in the art. This accommodates the scenario where a plug-in can be mapped to multiple identical accelerators in the same system depending on availability at time of execution.

The client PIM 118 and server PIMs 128, 128' actively communicate with each other via a handshaking arrangement. Handshaking between networked and non-networked system components is known in the art, and, in implementations of the invention, is used to identify available system resources. For example, the client PIM 118 may send a request to the server PIM 128 for execution of a particular plug-in on a type of accelerator. The server PIM 128, based upon the server PIM record of accelerator locations and upon the system load, determines and returns to the client PIM the network location of an accelerator for execution of the plug-in. In this manner, the plug-in may be dispatched to the appropriate accelerator, executed, and the results returned to the application.

Example of Use

Still referring to FIG. 3, in a first example of use, first application 112 is executing on the client 110. First application 112 sends a message to client PIM 118 that it requires execution of first plug-in 114. For purposes of this example, assume the client PIM 118, via the client PIM record, determines that the first plug-in 114 is located on the client 110 and is associated with third accelerator 136. The client PIM 118 sends a request over the network to any instance of the server PIM 128, 128' for execution of the first plug-in 114 on the third accelerator 136. The server PIM 128, via the server PIM record and the system load analysis, determines that the third accelerator 136 is located on the second server node 130 and is available for use. The server PIM 128 returns this information to the client PIM 118. The client PIM 118 sends a copy of the first plug-in 114 across the network to the third accelerator 136. The third accelerator 136 executes the first plug-in 114 and returns the results to the first application 112.

It is noted that there may be similar, or duplicate, accelerators within the subsystem 100. For example, the fifth accelerator 156 may be substantially identical to the third accelerator 136. Then, in the first example described above, the server PIM 128 determines, via the system load analysis, which of the two accelerators is better situated to handle the instant request to execute the plug-in. For example, if the third accelerator 136 is operating near 100% capacity, while the fifth accelerator 156 is sitting idle, then the server PIM 128 may direct the plug-in to the fifth accelerator for execution based upon the respective loads (i.e., system load).

Moreover, it is noted that there may be similar, or duplicate, plug-ins within the subsystem 100. For example, the third plug-in 134 may be substantially identical to the first plug-in 114. Then, in the first example described above, the client PIM 118 determines, via handshaking with server PIM 128', that a copy of the plug-in already resides on the same component as the desired accelerator. This may occur, for example, if the first plug-in 114 was sent to the second server node 130 in the past, and a copy (e.g., the third plug-in 134) was maintained on the second server node 130. (It is understood that there are other ways of populating plug-ins throughout the system.) In this case, the client PIM need not send a copy of the first plug-in 114 to the second server node 130, but, instead sends a request for execution of the third plug-in 134 on the third accelerator 136.

Furthermore it is noted that the application, plug-in, and accelerator may all be located on the same system component. For example, first application 112 may request the execution of first plug-in 114, which is associated with first accelerator 116. In this case, the first plug-in 114 may be loaded to the first accelerator 116, executed, and the results provided to the first application 112.

Still referring to FIG. 3, in a second exemplary use, first application 112 is executing on the client 110. First application 112 sends a message to client PIM 118 that it requires execution of second plug-in 124. For purposes of this example, assume the client PIM 118, via the client PIM record, determines that the second plug-in 124 is located on the first server node 120. The client PIM 118, via the client PIM record, also determines that the second plug-in 124 is associated with the fourth accelerator 146. The client PIM 118 sends a request to any instance of the server PIM 128, 128' for execution of the second plug-in 124 on the fourth accelerator 146. The server PIM 128', via the server PIM record and the system load analysis, determines that the fourth accelerator 146 is located on the fourth server node 140 and is available for use. The server PIM 128' returns this information to the client PIM 118. The client PIM 118 sends a request to the server PIM 128 located on the second server node 120 with the second plug-in 124 to send a copy of the second plug-in 124 to the fourth accelerator for execution. The server PIM 128 sends a copy of the second plug-in 124 to the fourth accelerator 146, the fourth accelerator 146 executes the second plug-in 124 accordingly, and the results are returned to the first application 112.

It is noted that that application is not restricted to residing on a client, as described above. The application may reside on a server, such as second application 122 which resides on second server node 120. In this manner, applications that execute on servers may also benefit from the ability to dispatch and remotely execute plug-ins on various accelerators throughout the system.

Method of Use

Figure 4:
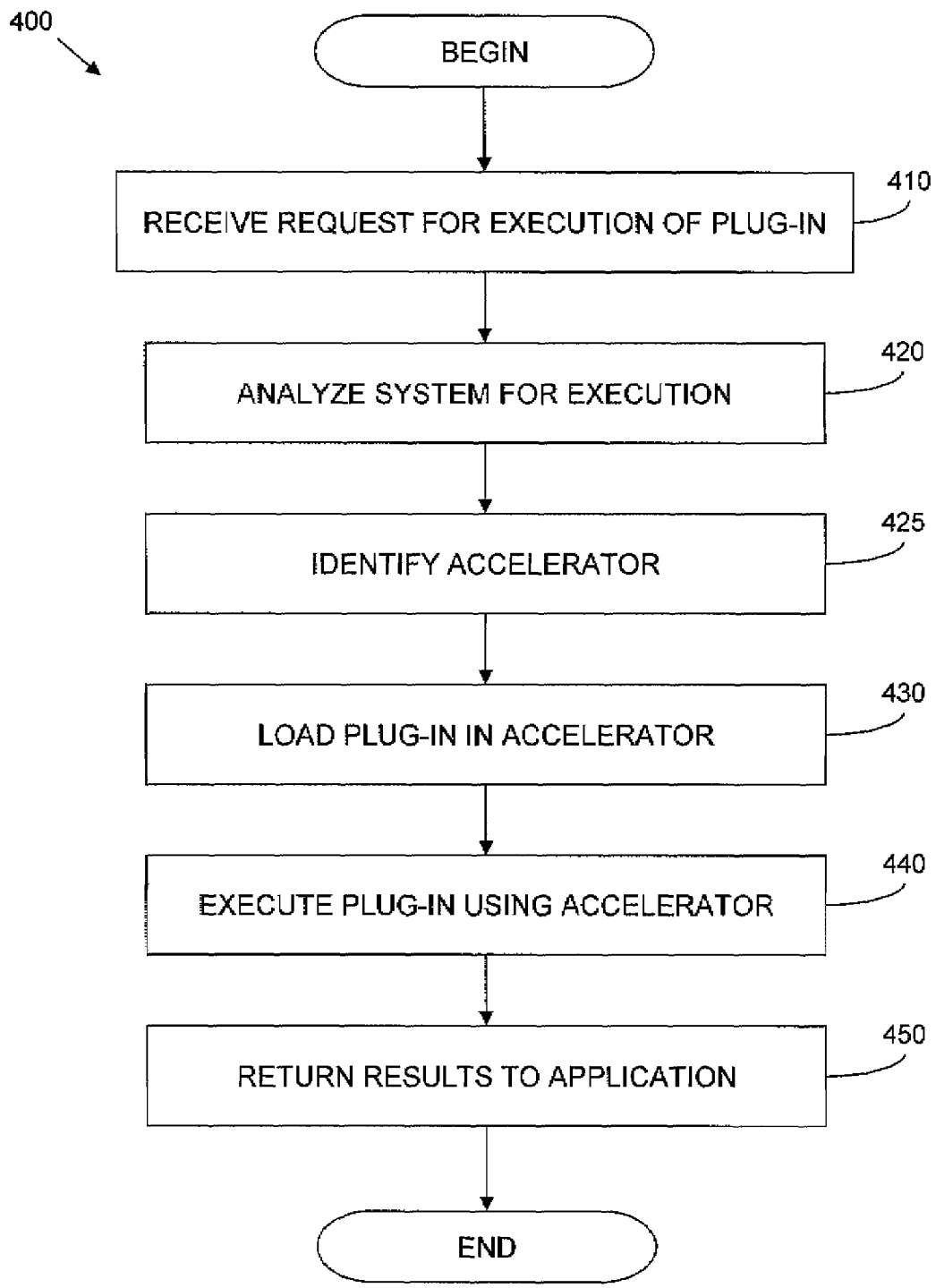
FIG. 4 shows a flow diagram of the method in accordance with aspects of the invention.

FIG. 4 is a flow diagram implementing steps of the invention. FIG. 4 may equally represent a high-level block diagram of the invention. The steps of FIG. 4 may be implemented and executed from either a server, in a client server relationship, or they may run on a user workstation with operative information conveyed to the user workstation to create the navigation outlined above. Additionally, the invention can take the form of an entirely hardware embodiment, an entirely software embodiment or an embodiment containing both hardware and software elements.

FIG. 4 shows a method 400 for executing plug-ins according to aspects of the invention. At step 410, a request for the execution of a plug-in is received. In embodiments, this comprises the client PIM receiving a request from an application for the execution of a plug-in. Alternatively, or additionally, it comprises the client PIM sending a request for execution of a plug-in to a server PIM, for example, using a handshaking routine, as described above. The request may include an identification of the accelerator, or type of accelerator, that is associated with the plug-in (e.g., from the client PIM record).

At step 420, the system is analyzed for execution of the requested plug-in. In embodiments, the server PIM determines accelerator(s) location(s) in the system and analyzes system load, as described above.

At step 425, the server PIM identifies and designates an optimal accelerator for use, based upon the analysis of step 420 (e.g., based upon available system resources). Step 425 may further comprise communicating the identification and location of the designated accelerator back to the client PIM.

At step 430, the plug-in is loaded to the designated accelerator. In embodiments, this comprises a handshaking between the client PIM and the designated accelerator. For example, the client PIM may send to the accelerator, via the network, a request to execute a particular plug-in and a copy of the plug-in. Alternatively, if the plug-in is already located locally with the accelerator, then no copy need be sent, and the already-resident plug-in is simply loaded to the accelerator. Loading is known in the art, and may be performed, for example, by a load module function.

At step 440, the plug-in is executed using the accelerator. In embodiments, this comprises the designated accelerator executing the plug-in with any associated data that was sent by the application or client PIM.

At step 450, the results of executing the plug-in are returned back to the application. In embodiments, this comprises transmitting the results to the application (e.g., over the network) in real-time as the accelerator is executing the plug-in. Alternatively, it may comprise executing the plug-in to generate a set of results, and then transmitting the set of results to the application. Step 450 may further comprise integrating the results into the application.

As described above, embodiments of the invention provide a system and method for executing plug-ins on accelerators that are remote from the application requiring the plug-in. Moreover, implementations of the invention provide a system and method for distributing and managing the execution of plug-ins in a network-connected system. In this manner, the invention increases the functionality of computing applications.

While the invention has been described in terms of embodiments, those skilled in the art will recognize that the invention can be practiced with modifications and in the spirit and scope of the appended claims.

What is claimed:

1. A method, comprising:
   a server receiving a request for execution of a plug-in of a computing application from a client device that is separate from the server;
   the server analyzing a network for accelerators for executing the plug-in;
   the server identifying a designated accelerator residing on a device that is remote from the application; and
   executing the plug-in with the designated accelerator, wherein:
      the server comprises a server plug-in manager;
      the client device comprises a client plug-in manager;
      the client plug-in manager is stored at the client device; and
      the client plug-in manager communicates with local applications and receives requests from the local applications for execution of one of the plurality of plug-ins;
   and wherein the method further comprises:
      automatically generating the client plug-in manager by querying network components at system start-up;
      determining, by the server plug-in manager, real-time system load; and
      maintaining, by the client plug-in manager, a record of a location and type of each of a plurality of plug-ins.

2. The method of claim 1, wherein the analyzing comprises determining available resources.

3. The method of claim 1, further comprising loading the plug-in to the designated accelerator by receiving a copy of the plug-in from the client device.

4. The method of claim 1, further comprising communicating results of the executing to the computing application by transmitting the results from a first network location where the designated accelerator resides to a second network location where the computing application resides.

5. The method of claim 1, further comprising at least one of creating, maintaining, and supporting a computer infrastructure that performs the receiving, analyzing, identifying, and executing.

6. The method of claim 1, wherein the receiving, analyzing, identifying, and executing are performed by a service provider.

7. A computer program product comprising a computer readable hardware storage device having a computer readable program, wherein the computer readable program when executed on a server computer causes the server computer to:
   the server computer receives a request for execution of a plug-in of an application from a client device that is separate from the server computer;
   the server computer analyzes a network for accelerators for executing the plug-in;
   the server computer identifies a designated accelerator residing on a device that is remote from the application; and
   execute the plug-in with the designated accelerator, wherein:
      the client device comprises a client plug-in manager; the server computer comprises a server plug-in manager; the server plug-in manager comprises a module that determines real-time system load;
      the client plug-in manager is stored at the client device;
      the client plug-in manager maintains a record of a location and type of each of a plurality of plug-ins; the client plug-in manager is automatically generated by querying network components at system start-up; and
      the client plug-in manager communicates with local applications and receives requests from the local applications for execution of one of the plurality of plug-ins.

8. A networked system, comprising:
   a computing application associated with a plug-in;
   a first manager arranged to associate the plug-in with at least one accelerator for executing the plug-in, wherein the at least one accelerator comprises a hardware accelerator; and
   a server comprising hardware and a second manager arranged to determine a location of the at least one accelerator,
   wherein:
      the first manager and the second manager are disposed at different locations within a network, and
      the second manager determines the designated one of the plurality of accelerators by analyzing system load and resource availability,
   and wherein:
      the computing application and the first manager are located at a client device, and
      the second manager is located at the server that is remote from the client device;
      the second plug-in manager comprises a module that determines real-time system load;
      the first plug-in manager maintains a record of a location and type of each of a plurality of plug-ins;
      the first plug-in manager is automatically generated by querying network components at system start-up; and
      the first plug-in manager communicates with local applications and receives requests from the local applications for execution of one of the plurality of plug-ins.

9. The system of claim 8, wherein the at least one accelerator is located at the server.

10. The system of claim 8, wherein the at least one accelerator is located at a server node that is remote from the server.

11. The system of claim 10, wherein the plug-in is located at the server node.

12. The system of claim 9, wherein the plug-in is located at the client device.

13. The system of claim 9, wherein the plug-in is located at the server.

14. The system of claim 8, wherein the first manager sends, via the network, a copy of the plug-in to the at least one accelerator.

15. The system of claim 8, wherein the at least one accelerator:
generates results by executing the plug-in, and
sends, via the network, the results to the computing application.

16. The system of claim 8, wherein:
the at least one accelerator comprises a plurality of accelerators, and
the second manager determines a designated one of the plurality of accelerators to execute the plug-in;
the at least one accelerator is configured to execute a specific class of plug-in;
the client device resides at a first network location;
the server resides at a second network location different from the first network location;
the at least one accelerator resides at a third network location different from the first network location and the second network location;
the second manager is configured to maintain a record that includes locations of the plural of accelerators;
the first plug-in manager is configured to send a request to the second manager, the request comprising a request to send a copy of the plug-in from the second network location to the third network location; and
the first plug-in manager includes an association between a respective one of the plurality of plug-ins and an associated respective one of the plurality of accelerators.

17. A method, comprising:
sending a request for execution of a plug-in of a computing application;
receiving a designation of an accelerator for executing the plug-in; and
receiving, over a network, results from execution of the plug-in,
wherein:
a client comprising the computing application performs the sending, the receiving the designation, and the receiving the results,
the client resides at a first network location,
the client determines the plug-in resides at a second network location different from the first network location,
the client determines the accelerator resides a third network location different from the first and second network locations, and
the request comprises a request to send a copy of the plug-in from the second network location to the third network location,
and wherein:
the client includes a client plug-in manager;
the server comprises a server plug-in manager;
a server plug-in manager comprises a module that determines real-time system load;
the client plug-in manager is stored at the client;
the client plug-in manager maintains a record of a location and type of each of a plurality of plug-ins;
the client plug-in manager is automatically generated by querying network components at system start-up; and
the client plug-in manager communicates with local applications and receives requests from the local applications for execution of one of the plurality of plug-ins.

18. The method of claim 1, wherein:
the server plug-in manager performs the receiving, the analyzing, and the identifying,
the server receives the request from the client plug-in manager;
the client plug-in manager maintains an association between a respective ones of the plug-ins and the accelerators, and
the server plug-in manager maintains a record of locations of the accelerators.

19. The method of claim 17, wherein:
the second network location comprises a server;
the plug-in is stored at the server;
the client plug-in manager sends the request to the server plug-in manager; and
the accelerator is configured to execute a specific class of plug-in.

20. The method of claim 19, wherein:
the server plug-in manager is stored at the server;
the server plug-in manager maintains a record that includes locations of plural accelerators; and
the client plug-in manager includes an association between a respective one of the plurality of plug-ins and an associated respective one of the plural accelerators.

21. The method of claim 1, wherein:
the plug-in is one of a plurality of plug-ins;
the designated accelerator is one of a plurality of accelerators;
the client device resides at a first network location;
the server resides at a second network location that is different from the first network location;
the designated accelerator resides at a third network location different from the first network location and the second network location;
the designated accelerator is configured to execute a specific class of plug-in; and
the method further comprises:
associating, by the client plug-in manager, a respective one of the plurality of plug-ins and an associated respective one of the plurality of accelerators;
maintaining, by the server plug-in manager, a record that includes locations of the plurality of accelerators;
determining by the client that the plug-in resides at the second network location;
determining by the client that the designated accelerator resides at the third network location; and
sending by the client plug-in manager a request to send a copy of the plug-in from the server plug-in manager location to the third network location.

22. The computer program product of claim 7, wherein:
the plug-in is one of a plurality of plug-ins;
the designated accelerator is one of a plurality of accelerators;
the client device resides at a first network location;
the server computer resides at a second network location that is different from the first location;
the designated accelerator resides at a third network location different from the first network location and the second network location;
the designated accelerator is configured to execute a specific class of plug-in; and
the computer program product further causes the server computer to maintain a record that includes locations of the plurality of accelerators by a server plug-in manager included in the server computer; and
the computer program product causes the client device to:

associate, by the client plug-in manager, respective one
of the plurality of plug-ins and an associated respective one of the plurality of accelerators;
determine that the plug-in resides at the second network location;
determine that the designated accelerator resides at the third network location; and
send, using the client plug-in manager, a request to send a copy of the plug-in from the server plug-in manager location to the third network location.

* * * * *